United States Patent [19]

Savariar

[11] Patent Number: 5,047,486

[45] Date of Patent: Sep. 10, 1991

[54] INTEGRATED PROCESS FOR THE PREPARATION OF POLYCARBONATE AND/OR POLYARYLATE BLOCK COPOLYMERS WITH POLY(ARYL ETHERS)

[75] Inventor: Selvaraj Savariar, Somerset, N.J.

[73] Assignee: Amoco Corporation, Chicago, Ill.

[21] Appl. No.: 332,881

[22] Filed: Apr. 3, 1989

[51] Int. Cl.$^5$ .................... C08G 81/00; C08G 64/18; C08G 63/672

[52] U.S. Cl. .................................. 525/394; 525/397; 525/439; 525/462; 525/466; 525/467; 525/470

[58] Field of Search ............... 525/394, 437, 439, 462, 525/466, 467, 470, 397

[56] References Cited

U.S. PATENT DOCUMENTS 3,770,699 11/1973 White .................................. 525/394

FOREIGN PATENT DOCUMENTS 149921 7/1985 European Pat. Off. .

OTHER PUBLICATIONS

McGrath, "BPA Polycarbonate-BPA Polysulfone Block Copolymers", *Polymer Eng. & Sci.*, Aug. 1977, vol. 17 #8.

*Primary Examiner*—John C. Bleutge
*Assistant Examiner*—David Buttner
*Attorney, Agent, or Firm*—Matthew R. Hooper; William H. Magidson; Ralph C. Medhurst

[57] ABSTRACT

A process for the preparation of poly(aryl ether) block copolymers with polycarbonates and/or polyarylates comprising the steps of a) reacting a hydroxy-terminated poly(aryl ether) with a high molecular weight aromatic polycarbonate, or a high molecular weight polyarylate, or a high molecular weight poly(arylatecarbonate) to yield a block copolymer; followed by b) coupling the material obtained in step a) under poly(aryl ether) forming conditions via the hydroxyl/activated dihalobenzenoid compound, or the hydroxyl/activated dinitrobenzenoid compound polycondensation process is described.

The polymerization is preferably performed in an integrated manner starting with the poly(aryl ether)-forming monomers and using a polar aprotic solvent. Materials with an overall excellent combination of properties are obtained.

2 Claims, No Drawings

INTEGRATED PROCESS FOR THE PREPARATION OF POLYCARBONATE AND/OR POLYARYLATE BLOCK COPOLYMERS WITH POLY(ARYL ETHERS)

FIELD OF THE INVENTION

This invention is directed to a novel process for the preparation of polycarbonate and/or polyarylate block copolymers with poly(aryl ethers). The process is comprised of the following steps:

(a). the reaction of a hydroxy-terminated poly(aryl ether) with a high molecular weight aromatic polycarbonate, or a high molecular weight polyarylate, or a high molecular weight poly(arylate-carbonate) to yield a block copolymer; followed by (b). the coupling of the material obtained in step (a) under poly(aryl ether) forming conditions using the hydroxyl/activated dihalobenzenoid compound, or the hydroxyl/activated dinitrobenzenoid compound polycondensation process.

Both steps are performed in the presence of a catalyst. The latter may be acidic or basic for step (a); it is a base for step (b). The two steps may be performed separately; it is preferred, however, to conduct the two reactions in a one-pot operation. The polymerizations may be run neat or in a solvent. The use of aprotic dipolar solvents is preferred.

The remarkable and totally unexpected feature of the instant invention is the fact that high molecular weight, high quality block copolymers, displaying an excellent combination of properties, excellent color and transparency, can be prepared in an integrated operation; i.e. starting with the poly(aryl ether) forming monomers and a high molecular weight polycarbonate, or a high molecular weight polyarylate, or a high molecular weight poly(arylate-carbonate).

The subject polycarbonate and/or polyarylate block copolymers with poly(aryl ethers) are useful thermoplastics per se, as well as in blends with other polymers, and in composites.

BACKGROUND OF THE INVENTION

Aromatic polycarbonates are polyesters of dihydric phenols and carbonic acid; they are tough engineering thermoplastics and have been known for more than three decades. A representative material of this class of polymers is the polycarbonate of 2,2-bis(4-hydroxyphenyl)propane(Bisphenol-A) of formula (1). Polymer (1) has a glass transition temperature (Tg) of about 150° C.; it is

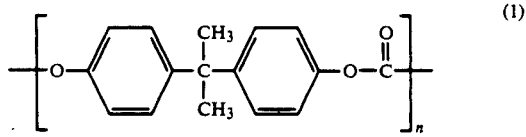

(1)

offered commercially by a number of companies. Polycarbonates are widely described in the literature-see, for example, Schnell, Angewandte Chemie, 1956, 68,633; and Fox, Encyclopedia of Chemical Technology, 3rd. Edition, 1982Vol. 18, pp. 479–494, John Wiley and Sons, New York, N.Y.

Polyarylates are aromatic polyesters derived from dihydric phenols and aromatic dicarboxylic acids. The material based on 2,2-bis(4-hydroxyphenyl)propane and a 50:50 mixture of terephthalic and isophthalic acids (2) is offered commercially by Amoco Performance Products, Inc., under the tradename Ardel D-100. Polyarylates are high temperature, high performance thermoplastic polymers

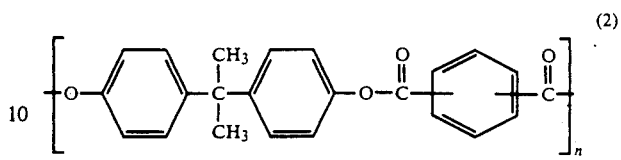

(2)

with a good combination of thermal and mechanical properties. They display excellent UV resistance and have good processibility which allows them to be molded into a variety of articles.

A group of related polymers which combine the characteristics of aromatic polycarbonates and polyarylates-the poly(arylate-carbonates)-are also known. The preparation of these latter materials is described in, for example, U.S. Pat. Nos. 3,030,331 and 3,169,121.

Over the years, there has been developed a substantial body of patent and other literature directed to the formation and properties of poly(aryl ethers) (hereinafter called "PAE's"). Some of the earliest work such as by Bonner, U.S. Pat. No. 3,065,205, involves the electrophilic aromatic substitution (e.g. Friedel-Crafts catalyzed) reaction of aromatic diacylhalides with unsubstituted aromatic compounds such as diphenyl ether. The evolution of this class to a much broader range of PAE's was achieved by Johnson et al., Journal of Polymer Science, A-1, Vol. 5, 1967, pp. 2415–2427, Johnson et al., U.S. Pat. Nos. 4,108,837 and 4,175,175. Johnson et al., show that a very broad range of PAE's can be formed by the nucleophilic aromatic substitution (condensation) reaction of an activated aromatic dihalide and an aromatic diol. By this method, Johnson et al. created a host of new PAE's.

PAE's presenting the greatest practical interest are those that contain the sulfone group. Thus, poly(aryl ether sulfones) (3) and (4)

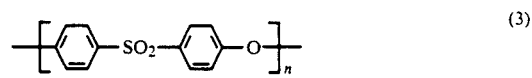

(3)

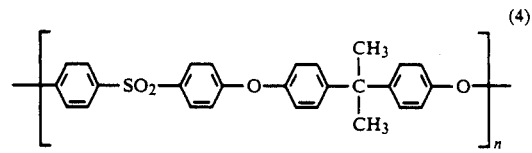

(4)

are commercially available tough thermoplastic materials. They possess a number of attractive features such as excellent high temperature resistance, good electrical properties, and very good hydrolytic stability. Polymer (3) is available from Imperial Chemical Industries, Ltd. under the trademark of Victrex ® Poly(ether sulfone). The resin contains no aliphatic moeities and has a heat deflection temperature of approximately 210° C. Material (4) is available from Amoco Performance Products, Inc., under the trademark of UDEL ®; and has a heat deflection temperature of about 180° C.

Efforts to combine the advantageous properties of an aromatic polycarbonate and/or of a polyarylate with those of an aromatic poly(aryl ether) were made over the years. Unique materials such as, for example, one having the UV resistance of a polyarylate and the hydrolytic stability of a poly(aryl ether) can be envisioned. Hence, a variety of alloys of the subject polymers were prepared. Blends of poly(aryl ethers) and polycarbonates are known from U.S. Pat. No. 3,365,517. The patent states that as a result of this blend, polycarbonate polymers are rendered more resistant to environmental stress crazing and cracking, and their heat distortion temperatures are increased; and that thermoplastic poly(aryl ethers) are rendered more resistant to thermal stress embrittlement. Shaped articles formed from a blend of a poly(aryl ether) resin and an aromatic polycarbonate and/or a polyarylate resin are described in U.S. Pat. No. 4,746,710. Improved hydrolytic stability for the obtained articles is claimed in the above patent. Thus, as can be seen, alloying of the subject resins does lead to materials with improved characteristics. The main drawback of the alloys in question is the fact, that due to the lack of polymerpolymer solubility, they are opaque; and cannot be used in applications where transparency is required.

To circumvent the transparency problem, block copolymers of aromatic polycarbonates and of polyarylates with aromatic poly(aryl ethers) were prepared. As expected, the copolymers displayed an overall combination of good properties and yielded transparent articles upon molding. The copolymers were studied extensively both in the United States and abroad. For block copolymers of aromatic polycarbonates with aromatic poly(aryl ethers)-see, for example, McGrath et al., Polymer Engineering and Science, 1977, 17, pp. 647-651; McGrath et al., J.Polym. Sci., Polymer Sympos., 1977, 60,pp. 29-46; McGrath et al., Polymer Preprints, American Chemical Society, 1978, 19 (1), pp. 109-114; and Ward et al., Polymer Preprints, American Chemical Society, 1978, 19 (1), pp. 115-120. Block copolymers incorporating polyarylates and aromatic poly(aryl ethers) are described in, for example, Storozhuk et al., Vysokomol. Soed., 1979,A, 21, pp. 152-160; Banthia et al., Org. Coat. Plast. Chem. 1980, 42, pp. 127-133; Dubrovina et al., Vysokomol. Soed., 1981,B, 23, pp. 384-388; Shelgaev et al., Vysokomol. Soed., 1982, A, 24, pp. 2315-2320; Webster et al., Contemp. Topics Polym. Sci., 1984, 4, pp. 959-975; Mikitaev et al., Vysokomol. Soed., 1984, A, 26, pp. 75-78; USSR Patent No. 1,121,277; German Patent Application No. 2,648,470; and Japanese Patent Application No. 62/215,626.

In addition, block copolymers were also prepared from poly(phenylene oxides) and aromatic polycarbonates (U.S. Pat. Nos. 4,436,876 and 4,463,132; World Patent Application No. 82/04,056) and polyarylates (European Patent Application No. 149,921); as well as from liquid crystalline polyesters and various poly(aryl ethers); see, for example, Matzner et al., U.S. Pat. No. 4,619,975; Matzner et al., U.S. Pat. No. 4,668,744; Lambert et al., Polymer Preprints, American Chemical Society, 1985, 26 (2), pp. 275-277; and Lambert, Ph.D. Dissertation, Virginia Polytechnic Institute and State University, February 1986.

All of the references pertaining to the preparation of block copolymers from polycarbonates or polyarylates with poly(aryl ethers) disclose exclusively routes utilizing phosgene or acid chlorides, the reactions being performed either in solution or in a two-phase interfacial system. A typical preparation of a block copolymer (see, for example, McGrath et al., J. Polym. Sci., Polymer Sympos., 1977, 60, p. 39) is shown in equation (I).

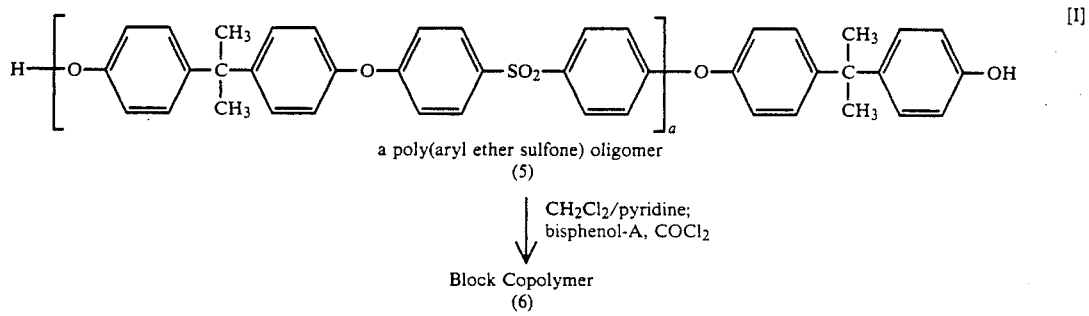

a poly(aryl ether sulfone) oligomer
(5)

$CH_2Cl_2$/pyridine;
bisphenol-A, $COCl_2$

Block Copolymer
(6)

The subject synthetic routes require excessive and/or toxic (e.g. phosgene) acid chlorides; large amounts of solvents must be handled and recycled; by-products (e.g. sodium chloride, aqueous effluents, etc.) must be safely disposed. Overall, the acid chloride processes are cumbersome, uneconomical and environmentally unattractive.

Melt processes were used in the preparation of block copolymers based on poly(aryl ethers) and liquid crystalline polyesters. The polymerization reactions were slow, however, and required several hours to attain high molecular weights. These processes involved the copolymerization of poly(aryl ethers) with the monomeric constituents of the liquid crystalline polyesters, e.g., p-hydroxybenzoic acid, terephthalic acid, biphenol, etc.

In summary, materials with good properties could be obtained via block copolymerization. However, their usefulness was severely limited because of the lack of an adequate, commercially acceptable process for their preparation.

THE INVENTION

This invention is directed to a novel process for the preparation of block copolymers of aromatic polycarbonates and/or polyarylates with poly(aryl ethers). The process does not require expensive and/or toxic starting materials and is environmentally attractive; the copolymerization can be carried out in commercial equipment and excellent quality material can be made in an integrated process starting with the poly(aryl ether) forming monomers.

Briefly, the process involves the following steps:
(a) the reaction of a hydroxy-terminated poly(aryl ether) oligomer with a high molecular weight aromatic polycarbonate, or a high molecular weight polyarylate, or a high molecular weight poly(arylate-carbonate); this reaction yields a hydroxy terminated block copolymer (8); and (b) the coupling of (8) to the final block copolymer (9) via reaction with an activated dihalo- or dinitrobenzenoid compound under poly(aryl ether) forming conditions.

The reaction sequence is represented in equation (II)

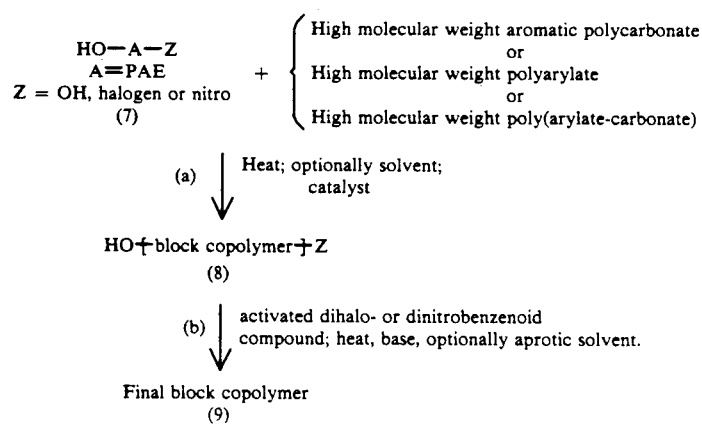

The two steps [(a) and (b)] may be performed separately; it is preferred, however, to perform both steps as a one-pot operation.

In its most preferred embodiment, the block copolymerization is run in an integrated manner, starting with the poly(aryl ether) forming monomers. As explained in the description of PAE's (see below), the latter are prepared via the nucleophilic polycondensation of a dihydric phenol with an activated dihalo- or dinitrobenzenoid compound in a dipolar aprotic solvent. The use of an excess of the dihydric phenol leads to the formation of a dihydroxy end-capped oligomer. A high molecular weight aromatic polycarbonate, or a high molecular weight polyarylate, or a high molecular weight poly(arylate-carbonate) can now be added to the reaction solution containing said dihydroxy-terminated poly(aryl ether) oligomer. Formation of a low molecular weight hydroxyl end-capped block copolymer [step (a), equation (II)] takes place upon heating; it is followed by the addition of the stoichiometric balance of the activated dihalo- or dinitrobenzenoid compound which may be the same or different from the one used originally for the preparation of the oligomer); and conducting the nucleophilic polycondensation under the required PAE conditions [step (b), equation (II)] until the final, high molecular weight block polymer (9) is formed. Alternatively, the poly(aryl ether) may be prepared using stoichiometric amounts of the reagents, i.e. of the dihydric phenol and the activated dihalo-or dinitrobenzenoid compound. At any point of the polymerization, a high molecular weight aromatic polycarbonate, or a high molecular weight polyarylate, or a high molecular weight poly(arylate-carbonate) may be added to the reaction mixture, and the polycondensation continued under PAE forming conditions. Both steps (a) and (b) now take place. Obviously, the average lengths of the blocks of the copolymer (9) will depend upon the degree of polycondensation reached by the polymerizing mixture at the moment of the polycarbonate and/or polyarylate addition. Relatively low block lengths result if the subject addition takes place in the early stages of the polymerization. Very long blocks are obtained if the polycarbonate and/or polyarylate are added toward the end of the reaction.

A distinguishing feature of this block copolymer forming process is the fact that it does not require the use of polycarbonates, polyarylates, or poly(arylatecarbonates) with reactive terminal functional groups. The process has been successful while employing, for example, commercial polycarbonates.

The process of the instant invention yields block copolymers of the general formulae (10), and/or (10a) and/or (10b).

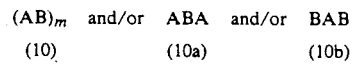

In the formulae (10), (10a) and (10b), A is the PAE block, and B is the aromatic polycarbonate, the polyarylate or the poly(arylate-carbonate) block; the molecular weights of the blocks A and B individually are at least 500, preferably at least 1,000 and most preferably at least 1,500; m is an integer and is one or greater. The weight ratio of the blocks A:B is in the range of from about 1:99 to about 99:1.

The Aromatic Polycarbonates

The thermoplastic aromatic polycarbonate resins that can be employed herein are homopolymers and copolymers and mixtures thereof, which have an intrinsic viscosity of from about 0.4 to about 1.0 dl/g as measured in methylene chloride or in chloroform at 25° C. The polycarbonates are prepared by reacting a dihydric phenol with a carbonate precursor. Typical of some of the dihydric phenols that may be employed are bisphenol-A, bis(4-hydroxyphenyl) methane, 2,2-bis(4-hydroxy-3-methylphenyl)-propane, 4,4-bis(4'-hydroxyphenyl)heptane, 2,2-bis(3,5,3',5'-tetrabromo-4,4'-dihydroxyphenyl)propane, (3,3'-dichloro-4,4'-dihydroxydipheny)methane, and the like. Other dihydric phenols of the bisphenol type are described in, for example, U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyesters.

The carbonate precursor may be either a carbonyl halide, a carbonate ester, or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates, such as di-(chlorophenyl)carbonate or di-(bromophenyl)carbonate, etc., di-(alkylphenyl)carbonates such as di(tolyl)carbonate, di(naphthyl)carbonate, di(chloronaphthyl)carbonate, etc. or mixtures thereof. The haloformates suitable for use herein include bishaloformates of dihydric phenols for example, bischloroformates of bisphenol-A, of hydroquinone, etc. or glycols for example, bishaloformates of ethylene glycol, neopentyl glycol, polyethylene glycol, etc. While other carbonate precursors will be apparent to those skilled in the art, carbonyl chloride, also known as phosgene, is preferred.

The aromatic polycarbonate polymers may be prepared by methods well known in the art by using phosgene or a haloformate and by employing a molecular weight regulator, an acid acceptor and catalyst. The molecular weight regulators which can be employed in carrying out the process include monohydric phenols, such as phenol, para-tertiary-butylphenol, para-bromophenol, primary and secondary amines, etc. Preferably, a phenol is employed as the molecular weight regulator.

A suitable acid acceptor may be either an organic or an inorganic acid acceptor. A suitable organic acid acceptor is a tertiary amine and includes materials, such as pyridine, triethylamine, dimethylaniline, tributylamine, etc. The inorganic acid acceptor may be one which can be either a hydroxide, a carbonate, or a bicarbonate of an alkali or alkaline earth metal.

The catalysts which are employed herein can be any of the suitable catalysts that aid the polymerization of, for example, bisphenol-A with phosgene. Suitable catalysts include tertiary amines, such as triethylamine, tripropylamine, N,N-dimethylaniline, quaternary ammonium compounds, such as tetraethylammonium bromide, cetyl triethyl ammonium bromide, tetra-n-heptylammonium iodide, and quaternary phosphonium compounds, such as n-butyltriphenyl phosphonium bromide and methyl-triphenyl phosphonium bromide.

The polycarbonates can be prepared in a one-phase (homogeneous solution) or a two-phase (interfacial) systems when phosgene, or a haloformate are used. Bulk reactions are possible when the diarylcarbonate precursors are used. These methods are described in, for example, U.S. Pat. Nos. 3,153,008 and 3,028,365. The preferred polycarbonate is bisphenol-A polycarbonate.

The Polyarylates

The polyarylate resins which are suitable for use in this invention are derived from a dihydric phenol and at least one aromatic dicarboxylic acid and have a reduced viscosity of from about 0.4 to greater than about 1.0, preferably from about 0.6 to about 0.8 dl/gm, as measured in chloroform (0.5 g/100ml chloroform) or other suitable solvent at 25° C.

A particularly desirable dihydric phenol is of the following formula:

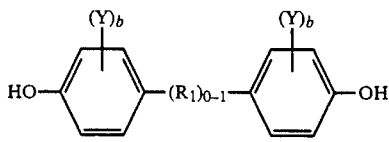

wherein Y is independently selected from hydrogen, alkyl groups of 1 to 4 carbon atoms, chlorine or bromine, each b, independently, has a value of from 0 to 4, inclusive, and $R_1$ is a divalent saturated or unsaturated aliphatic hydrocarbon radical, particularly an alkylene or alkylidene radical having from 1 to 6 carbon atoms, or a cycloalkylidene or cycloalkylene radicals having up to and including 9 carbon atoms, O, CO, $SO_2$, or S. The dihydric phenols may be used individually or in combination.

The dihydric phenols that may be used in this invention include the following:
2,2-bis(4-hydroxyphenyl)propane(Bisphenol-A),
bis(2-hydroxyphenyl)methane,
bis(4-hydroxyphenyl)methane,
bis(4-hydroxy-2,6-dimethyl-3-methoxyphenyl)methane,
1,1-bis(4-hydroxyphenyl)ethane,
1,2-bis(4-hydroxyphenyl)ethane,
1,1-bis(4-hydroxy-2-chlorophenyl)ethane,
1,2-bis(3-methyl-4-hydroxyphenyl)ethane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane,
2,2-bis[2-isopropyl-4-hydroxyphenyl)propane,
2,2-bis(4-hydroxyphenyl)pentane,
3,3-bis(4-hydroxyphenyl)pentane,
2,2-bis(4-hydroxyphenyl)heptane,
1,2-bis(4-hydroxyphenyl)1,2-bis-(phenyl)propane,
4,4'-dihydroxydiphenyl ether,
4,4'-dihydroxydiphenyl sulfide,
4,4'-dihydroxydiphenyl sulfone,
4,4'-dihydroxydiphenyl sulfoxide,
4,4'-dihydroxybenzophenone, naphthalene diols, hydroquinone and resorcinol.

Bisphenol-A is the preferred dihydric phenol.

The aromatic dicarboxylic acids that may be used in this invention include terephthalic acid, isophthalic acid, and any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Acetoxybenzoic acid can also be used. Preferably, mixtures of isophthalic acid and terephthalic acid are used. The isophthalic acid to terephthalic acid ratio in the mixtures is from about 0:100 to about 100:0, while the most preferred acid ratio is in the range of about 85:15 to about 15:85. Also, from about 0.5 to about 20 percent of aliphatic diacids containing from 2 to about 10 carbon atoms, such as adipic acid, sebacic acid, and the like may be additionally used in the polymerization reaction.

The polyarylates can be prepared by any of the well known prior art polyester forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids with the diester derivatives of the dihydric phenol. These processes are described in, for example, U.S. Pat. Nos. 3,317,464; 3,948,856; 3,780,148; 3,824,213; and 3,133,898.

The polyarylates are preferably prepared by the process as set forth in U.S. Pat. No. 4,321,355. This process comprises the following steps:

(a) reacting an acid anhydride derived from an acid containing from 2 to 8 carbon atoms with at least one dihydric phenol to form the corresponding diester; and (b) reacting said diester with at least one aromatic dicarboxylic acid at a temperature sufficient to form the polyarylate, wherein the improvement comprises removing residual acid anhydride after formation of the dihydric phenol diester so that its concentration is less than about 1500 parts per million.

The suitable acid anhydride is derived from an acid containing from 2 to 8 carbon atoms. The preferred acid anhydride is acetic anhydride.

The dihydric phenol is described above.

Generally, the dihydric phenol reacts with the acid anhydride under conventional esterification conditions to form the dihydric phenol diester. The reaction may take place in the presence or absence of a solvent. Additionally, the reaction may be conducted in the presence of a conventional esterification catalyst or in the absence thereof.

Poly(arylate-carbonates)

These materials are described in, for example, U.S. Pat. No. 3,169,121, herein incorporated by reference. Such copolyesters comprise recurring carbonate groups

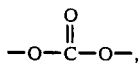

carboxylate groups

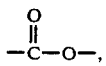

and aromatic groups in the linear polymer chain, in which at least some of the carboxylate groups and at least some of the carbonate groups are bonded directly to ring carbon atoms of the aromatic groups. The copolyesters are prepared by reacting, as essential ingredients, a difunctional carboxylic acid, a difunctional phenol, and a carbonate precursor, methods for preparing the copolyesters being well known, and disclosed in U.S. Pat. Nos. 3,030,331 and 3,169,121, among others. These copolyesters comprise at least two of the following four recurring units in their linear chain.

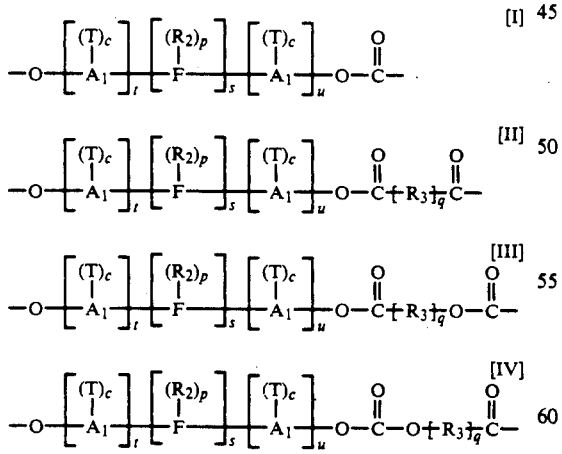

wherein $A_1$ and $R_3$ are independently aromatic groups such as phenylene, biphenylene, naphthylene, anthracenylene, and the like;

F may be an alkylene, cycloalkylene, alkylidene or cycloalkylidene group such as methylene, ethylene, propylene, propylidene, isopropylidene, butylene, butylidene, amylene, isoamylene, amylidene, isoamylidene, cyclohexylene, cyclohexylidene, and the like;

$R_2$ is hydrogen, alkyl, cycloalkyl, aryl, and the like;

T is an inorganic atom such as chlorine, bromine, or fluorine, an inorganic group such as nitro, an organic group such as $R_2$ above, or any alkoxy group such as $OR_2$, it being only necessary that T be inert to and unaffected by the reactants and reaction conditions;

c is any whole number from and including zero through the number of positions available on A for substitution;

p is any whole number from and including zero through the number of available positions on F;

q is a whole number equal to at least one.

s is either zero or one;

t is a whole number equal to at least one; and u is any whole number including zero.

Examples of dihydric phenols useful in making polyestercarbonates include all of those mentioned in connection with making polyarylates, supra.

The carboxylic acids useful in making polyestercarbonates include:

saturated, aliphatic dibasic acids derived from straight chain paraffin hydrocarbons such as oxalic, malonic, dimethyl malonic, succinic, glutaric, adipic, pimelic, suberic, azelaic, and sebacic acid, and halogen-substituted derivatives thereof;

aliphatic carboxylic acids containing hetero atoms in their aliphatic chain, such as thio-diglycolic or diglycolic acid;

unsaturated acids such as maleic or fumaric;

aromatic and aliphatic-aromatic dicarboxylic acids such as phthalic, isophthalic, terephthalic, homophthalic, o-, m-, and p-phenylene diacetic acid, and polynuclear aromatic diacids (e.g. naphthalene dicarboxylic).

hydroxy acids including aliphatic hydroxy acids such as hydroxybutyric, glycolic, and lactic acid, aliphatic-aromatic hydroxy acids such as mandelic and o, m, and p-hydroxybenzoic acid; and long chain fatty acids such as 12-hydroxystearic acid;

cycloaliphatic acids including tetrahydrophthalic, tetrahydroterephthalic, tetrahydroisophthalic, and the like.

A preferred polyester carbonate results from the condensation of phosgene, terephthaloyl chloride, isophthaloyl chloride with bisphenol-A and a small amount of p-tert-butylphenol as the chain terminator. The reduced viscosities of the poly(arylate-carbonates) are generally in the range that was found to be useful for polyarylates.

Poly(aryl ethers), PAE's

The aryl ether blocks of the instant invention are of the formula

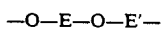

wherein E is the residuum of a dihydric phenol, and E' is the residuum of a benzenoid compound having an inert electron withdrawing group in at least one of the positions ortho and para to the valence bonds; both of said residua are valently bonded to the ether oxygens through aromatic carbon atoms. Aromatic polyethers containing such units are described in, for example, U.S.

Pat. Nos. 3,264,536 and 4,175,175. It is preferred that the dihydric phenol be a weakly acidic dinuclear phenol such as, for example, the dihydroxy diphenyl alkanes or the nuclear halogenated derivatives thereof, such as for example, the 2,2-bis(4-hydroxyphenyl)propane, 1,1-bis(4-hydroxyphenyl)-2-phenyl ethane, bis(4-hydroxyphenyl)methane, or their chlorinated derivatives containing one or two chlorines on each aromatic ring. Other materials also termed appropriately bisphenols are also highly valuable and preferred. These materials are the bisphenols of a symmetrical or unsymmetrical joining group, as for example, ether oxygen (—O—), sulfone

or hydrocarbon residue in which the two phenolic nuclei are joined to the same or different carbon atoms of the residue.

Such dinuclear phenols can be characterized as having the structure:

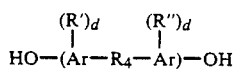

wherein Ar is an aromatic group and preferably is a phenylene group, R' and R" can be the same or different inert substituent groups such as alkyl groups having from 1 to 4 carbon atoms, aryl, halogen atoms, i.e., fluorine, chlorine, bromine or iodine, or alkoxyl radicals having from 1 to 4 carbon atoms, the d's are independently integers having a value of from 0 to 4, inclusive, and $R_4$ is representative of a bond between aromatic carbon atoms as in dihydroxyl-diphenyl, or is a divalent radical, including for example, radicals such as —O—, —S—, —S—S——SO—, —SO$_2$, and divalent hydrocarbon radicals such as alkylene, alkylidene, cycloalkylene, cycloalkylidene, or the halogen, alkyl, aryl, or like substituted alkylene, alkylidene or cycloaliphatic radicals as well as aromatic radicals and radicals fused to both Ar groups.

Examples of specific dihydric polynuclear phenols include among others:
the bis(hydroxyaryl) alkanes such as
2,2-bis(4-hydroxyphenyl)propane,
2,4'-dihydroxydiphenylmethane,
bis(2-hydroxyphenyl)methane,
bis(4-hydroxyphenyl)methane,
bis(4-hydroxy-2,6-dimethyl-3-methoxyphenyl)methane,
1,1-bis(4-hydroxyphenyl)ethane,
1,2-bis(4-hydroxyphenyl)ethane,
1-bis(4-hydroxy-2-chlorophenyl)ethane,
1,1-bis(3-methyl-4-hydroxyphenyl)propane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane
2,2-bis(2-isopropyl-4-hydroxyphenyl)propane
2,2-bis(4-hydroxynaphthyl)propane
2,2-bis(4-hydroxyphenyl)pentane,
3,3-bis(4-hydroxyphenyl)pentane,
2,2-bis(4-hydroxyphenyl)heptane,
bis(4-hydroxyphenyl)phenylmethane,
2,2-bis(4-hydroxyphenyl)-1-phenyl-propane,
2,2-bis(4-hydroxyphenyl)1,1,1,3,3,3,-hexafluoropropane
and the like;
di(hydroxyaryl sulfones) such as
bis(4-hydroxyphenyl)sulfone,
2,4'-dihydroxydiphenyl sulfone,
5-chloro-2,4'-dihydroxydiphenyl sulfone,
5-chloro-4,4'-dihydroxydiphenyl sulfone, and the like;
di(hydroxyaryl)ethers such as
bis(4-hydroxyphenyl)ether,
the 4,3'-, 4,2'-, 2,2'-, 2,3'-dihydroxydiphenyl ethers,
4,4'-dihydroxy-2,6-dimethyldiphenyl ether,
bis(4-hydroxy-3-isopropylphenyl)ether,
bis(4-hydroxy-3-chlorophenyl)ether,
bis(4-hydroxy-3-fluorophenyl)ether,
bis(4-hydroxy-3-bromophenyl)ether,
bis(4-hydroxynaphthyl)ether,
bis(4-hydroxy-3-chloronaphthyl)ether, and
4,4'-dihydroxy-3,6-dimethoxydiphenyl ether.

Other useful diphenols are, for example, the naphthalene diols, and the mononuclear diphenols such as hydroquinone or resorcinol. Dihydroxydiphenyls such as 4,4'-biphenol are also very useful.

As herein used, the E term is defined as being the "residuum of the dihydric phenol" of course refers to the residue of the dihydric phenol after the removal of the two aromatic hydroxyl groups. Thus, as is readily seen, these aryl ether units contain groups of the residuum of the dihydric phenol and the residuum of the benzenoid compound bonded through aromatic ether oxygen atoms.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho or para to the halogen or nitro group. The dihalobenzenoid or dinitrobenzenoid compound can be either mononuclear, where the halogens or nitro groups are attached to the same benzenoid ring; or polynuclear where they are attached to different benzenoid rings, as long as there is an activating electron withdrawing group in the ortho or para position of that benzenoid nucleus. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about one percent and preferably below 0.5 percent for best results.

An electron withdrawing group is employed as the activator group in these compounds. It should be, of course, inert under the reaction conditions, but otherwise its structure is not critical. Preferred are the strongly activating groups such as the sulfone group

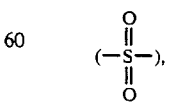

bonding two halogen or nitro substituted benzenoid nuclei, as in 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated.

The activating groups can be basically either of two types:

(a) monovalent groups that activate one or more halogens or nitro groups on the same ring such as another nitro or halo group, phenylsulfone, or alkylsulfone, cyano, trifluoromethyl, nitroso, and hetero nitrogen, as in pyridine.

(b) divalent groups which can activate displacement of halogens on two different rings, such as

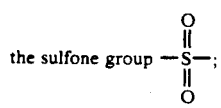

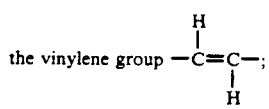

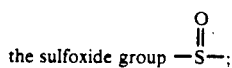

the azo group —N=N—;

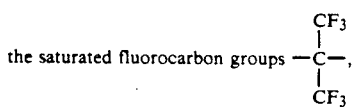

—CF$_2$CF$_2$CF$_2$—;

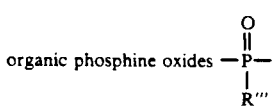

where R''' is a hydrocarbon group; and the ethylidene group

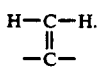

If desired, the polymers may be made with mixtures of two or more dihalobenzenoid or dinitrobenzenoid compounds. Thus, the E' residuum of the benzenoid compounds in the polymer structure may be the same of different.

It is seen also that as used herein, the E' term defined as being the "residuum of the benzenoid compound" refers to the aromatic or benzenoid residue of the compound after the removal of the halogen atom or nitro group on the benzenoid nucleus.

Preferred aryl ether units of this invention are those prepared using the dihydric polynuclear phenols of the formulae (11)–(15) including the derivatives thereof which are substituted with inert substituent groups;

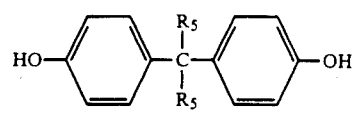

in which the R$_5$ groups represent independently hydrogen, lower alkyl, aryl and the halogen substituted derivatives thereof;

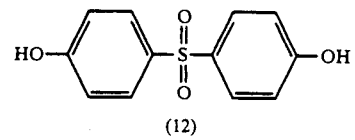

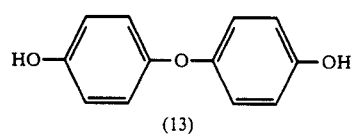

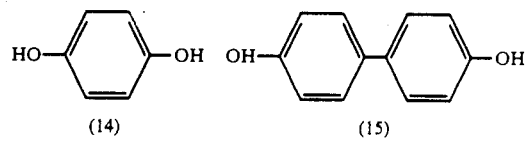

and substituted derivatives thereof.

It is also contemplated in this invention to use a mixture of two or more different dihydric phenols to accomplish the same ends as above. Thus, when referred to above, the —E— residuum in the polymer structure can actually be the same or different aromatic residua.

The preferred dihalobenzenoid compounds are (16), (17), (18), and (19); they may carry inert substituent groups.

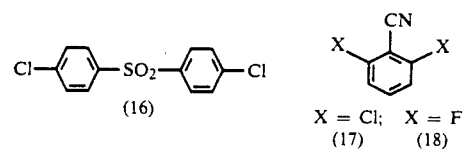

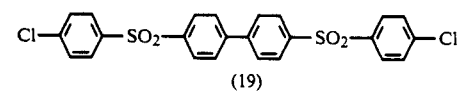

The preferred aryl ether blocks are those containing sulfone groups. Most preferred blocks are those containing one or more units of the formulae (3a), (4a), (20), and (21).

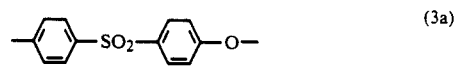

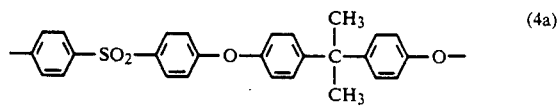

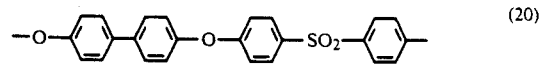

-continued

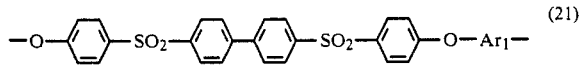

wherein Ar₁ is one or more of

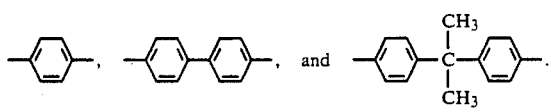

The poly(aryl ethers) may be prepared by either of two methods, i.e., the carbonate method or the alkali metal hydroxide method.

In the carbonate method, the polymers are prepared by contacting substantially equimolar amounts of the hydroxy-containing compounds and the dihalo- or dinitrobenzenoid compounds, e.g., 4,4'-dichlorodiphenyl sulfone or 4,4'-difluorodiphenyl sulfone, with from about 0.5 to about 1.0 mole of an alkali metal carbonate per mole of hydroxyl group in a solvent mixture comprising a solvent which forms an azeotrope with water in order to maintain the reaction medium at substantially anhydrous conditions during the polymerization.

The temperature of the reaction mixture is kept at about 170° C. to about 250° C., preferably from about 210° C. to about 235° C. for about one to about 15 hours.

In a modification which is particularly suitable for making copolymers from bisphenol A and one or more additional dihydroxy compounds, the reactants other than said additional dihydroxy compounds are charged and heated at from about 120° C. to about 180° C. for about one to about 5 hours, said additional dihydroxy compounds are added, the temperature is raised and the mixture is heated at from about 200° C. to about 250° C., preferably from about 210° C. to about 240° C., for about one to about 10 hours. This modification is further described in the copending U.S. patent application of Donald R. Kelsey, et al., Ser. No. 068,973, filed July 1, 1987, commonly assigned.

The reaction is carried out in an inert atmosphere, e.g., nitrogen, at atmospheric pressure, although higher or lower pressures may also be used.

The polyarylether is then recovered by conventional techniques such as coagulation, solvent evaporation, and the like.

The solvent mixture comprises a solvent which forms an azeotrope with water and a polar aprotic solvent. The solvent which forms an azeotrope with water includes an aromatic hydrocarbon such as benzene, toluene, xylene, ethylbenzene, chlorobenzene, and the like.

The polar aprotic solvents employed in this invention are those generally known in the art for the manufacture of polyarylether sulfones and include sulfur containing solvents such as those of the formula:

$R_6—S(O)_\delta—R_6$ in which each $R_6$ represents a monovalent lower hydrocarbon group free of aliphatic unsaturation, which preferably contains less than about 8 carbon atoms or when connected together represents a divalent alkylene group with $\delta$ being an integer from 1 to 2 inclusive. Thus, in all of these solvents, all oxygens and two carbon atoms are bonded to the sulfur atom. Contemplated for use in this invention are such solvents as those having the formula:

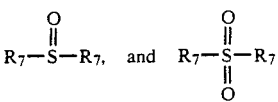

where the $R_7$ groups are independently lower alkyl, such as methyl, ethyl, propyl, butyl, and like groups, and aryl groups such as phenyl and alkylphenyl groups such as the tolyl group, as well as those where the $R_7$ groups are interconnected as in a divalent alkylene bridge such as

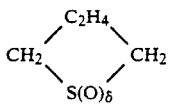

in tetrahydrothiophene oxides and dioxides. Specifically, these solvents include dimethylsulfoxide, dimethylsulfone, diphenylsulfone, diethylsulfoxide, diethylsulfone, diisopropylsulfone, tetrahydrothiophene 1,1-dioxide (commonly called tetramethylene sulfone or sulfolane) and tetrahydrothiophene-1 monoxide.

Additionally, nitrogen containing solvents may be used. These include dimethylacetamide, dimethylformamide and N-methylpyrrolidone.

The azeotrope forming solvent and polar aprotic solvent are used in a weight ratio of from about 1:10 to about 1:1, preferably from about 1:5 to about 1:3.

In the reaction, the hydroxy containing compound is slowly converted, in situ, to the alkali salt thereof by reacting with the alkali metal carbonate. The alkali metal carbonate is preferably potassium carbonate. As indicated before, mixtures of carbonates such as potassium and sodium carbonate may also be used.

Water is continuously removed from the reaction mass as an azeotrope with the azeotrope forming solvent so that substantially anhydrous conditions are maintained during the polymerization.

It is essential that the reaction medium be maintained substantially anhydrous during the polycondensation. While amounts of water up to about one percent can be tolerated, and are somewhat beneficial when employed with fluorinated dihalobenzenoid compounds, amounts of water substantially greater than this are desirably avoided as the reaction of water with the halo and/or nitro compound leads to formation of phenolic species and only low molecular weight products are secured. Consequently, in order to secure the high polymers, the system should be substantially anhydrous, and preferably contain less that 0.5 percent by weight water during the reaction.

While the carbonate method for preparing the polymers of this invention is simple and convenient, in some cases products of higher molecular weight can be made by the alkali metal hydroxide method. In the alkali metal hydroxide method, described by Johnson et al., U.S. Pat. Nos. 4,108,837 and 4,175,175, a double alkali metal salt of a dihydric phenol is contacted with a dihalobenzenoid compound in the presence of a sulfur containing solvent as herein above defined at temperatures of at least about 140° C., under substantially anhydrous conditions.

Additionally, the poly(aryl ether) polymers may be prepared by other methods known in the prior art, in which at least one dihydric phenol and at least one dihalobenzenoid compound are heated, for example, with a mixture of sodium carbonate or bicarbonate and a second alkali metal carbonate or bicarbonate having a higher atomic number than that of sodium, as described in U.S. Pat. No. 4,176,222. Bulk reactions are also known.

PAE Oligomers

As indicated in equation (II) the process of the instant invention proceeds in two steps, (a) and (b). The two steps can be performed separately or as a one-pot operation. In some instances it may be advantageous to use well-defined, dihydroxy-terminated oligomers (7) as

HO—A—Z

Z=OH;A=PAE    (7)

the starting materials. The products can be prepared using the methods that were outlined for the preparation of the corresponding high molecular weight poly(aryl ethers).

Typically, the nucleophilic polycondensation of an excess of the dihydric phenol with the activated dihalo- or dinitrobenzenoid compound yields a dihydroxy end-capped oligomer. The molecular weight of the oligomer is inversely proportional to the excess of diphenol employed; i.e., the higher the excess of the dihydric phenol, the lower the molecular weight of the resulting oligomer. A preparation is shown in equation (III), where l is one or greater.

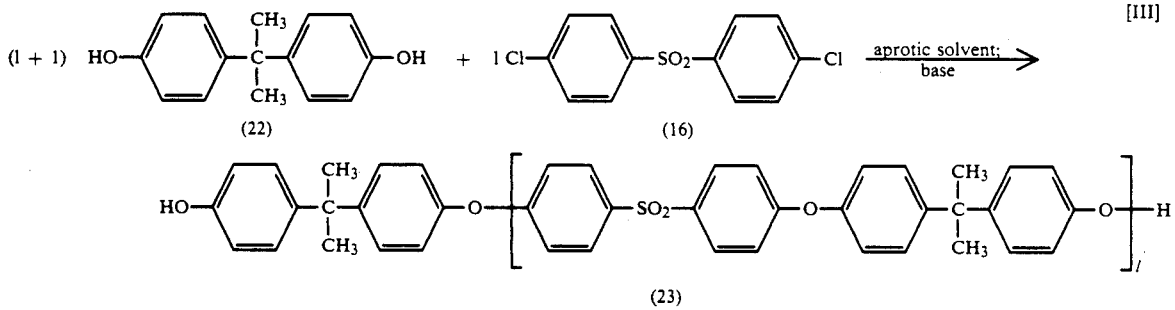

Block Copolymerization

As indicated in equation (II), the coupling step (b) is performed via reaction of the copolymer (8) with an activated dihalo- or dinitrobenzenoid material. Depending on the process variant, the latter may be any dihalo- or dinitrobenzenoid compound; the same as the one used to prepare the PAE oligomer, or a different monomer. Alternatively, for example, if stoichiometric amounts of PAE reagents are used (vide supra), the activated dihalo- or dinitrobenzenoid compound will be a growing oligomeric chain end. In order to obtain high polymer it is best to use from about 0.98 to about 1.05 equivalents of the activated compound per hydroxyl group; amounts in the range of from about 0.99 to about 1.02 equivalents of the dihalo- or dinitro material per OH group are preferred. Most preferred are ratios of 1:1.

Both steps (a) and (b) are performed in the presence of a catalyst. Both acid (e.g., protonic or Lewis acids) and base catalysts are useful for step (a). Step (b) must be performed in the presence of a base. Useful bases include, for example, alkali and alkaline earth metal hydroxides, oxides, phenoxides, alkoxides, carbonates and bicarbonates, and hydrides. Sodium and potassium derivatives are the preferred base catalysts.

As far as step (a) is concerned, the amount of catalyst can be in the range of from about 0.25 to about 100 mole percent based on the number of moles of the hydroxy poly(aryl ether) employed. In non-integrated processes, amounts in the range of from about 0.5 to about 3 mole percent are preferred; while most preferred is the catalyst range of from about 0.75 to about 1.5 mole percent. As described earlier (vide supra) step (b) requires a base in an amount which is at least equivalent to the concentration of hydroxyl groups.

The reactions [steps (a) and (b)] can be performed in bulk or in solution. It is preferred to use dipolar aprotic solvents and run the polycondensations at temperatures of about 140° to about 250° C. at solids levels of from about 20 to about 70 percent; the temperature range of from about 140° to about 235° C. is preferred. In its most preferred embodiment, the preparation of the block copolymers is conducted as an integrated operation starting with the poly(aryl ether) forming reagents (vide supra). Reaction times vary from about 1 to about 15 hours, depending on the particular reactants.

The block copolymers of the present invention exhibit a reduced viscosity of from about 0.30 to about 5.0, and preferably from about 0.35 to about 2.0 dl/g as measured in an appropriate solvent (e.g. chloroform), at a concentration of 0.2 g/100 ml, at 25° C.

The block copolymers of this invention may include mineral fillers such as carbonates including chalk, calcite and dolomite; silicates including mica, talc, wollastonite; silicon dioxide; glass spheres; glass powders; aluminum; clay, quartz; and the like. Also, reinforcing fibers such as fiberglass, carbon fibers, and the like may be used. The polymers may also include additives such as titanium dioxide; thermal stabilizers; ultraviolet light stabilizers, plasticizers, and the like.

The materials of this invention may be fabricated into any desired shape, i.e. moldings, coatings, films or fibers. They are also useful in blends with a variety of other polymers.

EXAMPLES

The following examples serve to give specific illustrations of the practice of this invention but they are not intended in any way to limit the scope of this invention.

General

All reduced viscosities were measured in CHCl$_3$, at 25° C., at a concentration of 0.2 g/100 ml.

EXAMPLE 1

This example describes the preparation of a 1:1 by weight poly(aryl ether)/polycarbonate block copolymer wherein the poly(aryl ether) and the polycarbonate segments are of the formulae (4) and (1), respectively. The reaction was performed in an integrated manner; a dihydroxy-terminated oligomer of (4) was formed in-situ, prior to reaction with bisphenol-A polycarbonate.

APPARATUS

A 250 ml. 4-neck round bottom flask, provided with a stirrer; the second neck was connected via a Claisen adaptor to a nitrogen inlet and a vacuum jacketed condenser on top of which was placed a two-way addition funnel and a water cooled condenser. The third neck was provided with a thermocouple; and the last neck was closed with a stopper and served to perform various additions, etc. . . .

PREPARATION

Into the flask were placed 15.214 g (0.04 moles) of the hexahydrate of bisphenol-A disodium salt and 100 ml of chlorobenzene. The mixture was stirred and refluxed with nitrogen bubbling through it, until all of the theoretical water (4.32 ml) was removed. Fifty ml. of dimethyl sulfoxide (DMSO) were added. The temperature was raised to 155° C. and a clear, straw colored solution was obtained. Simultaneously, a solution of 11.49 gms (0.04 moles) of 4,4'-dichlorodiphenyl sulfone in 15 ml chlorobenzene was prepared in an addition funnel using slight heating. The addition funnel was placed into one of the necks of the flask, and 92 percent of the solution contained in it was added to the reaction mixture. After 1.5 hours at 155° C., 18 gms of solid polycarbonate were added. The polycarbonate used was Lexan 101 of formula (1), produced by the General Electric Co., and its reduced viscosity (RV) was 0.62 dl/g. Within about 0.5 hours all of the solid polycarbonate dissolved. The remainder (8 percent) of the 4,4'-dichlorodiphenyl sulfone solution were now added, and the reaction mixture was heated at 155° C. for an additional two hours. After cooling to 80° C., a solution of 1 gm oxalic acid dihydrate in 5 ml DMSO was added to the mixture. The viscous solution was diluted with chlorobenzene, filtered to remove the inorganic salts and coagulated into methanol. The polymer was dried till constant weight at 110° C. under reduced pressure (50 mm). Its reduced viscosity was 0.37 dl/g.

EXAMPLE 2

Using the technique of Example 1, a block copolymer containing a 1:1 by weight ratio of segments (2) and (4) was prepared. Details were the same as in Example 1, except that 18 gms of polyarylate Ardel D-l00, produced by Amoco Performance Products, Inc.; and having an RV of 0.59 dl/g were used.

The reduced viscosity of the obtained block copolymer was 0.45 dl/g.

EXAMPLE 3

This example describes the preparation of a 1:1 by weight poly(aryl ether)/polycarbonate block copolymer having the same composition as the material made in example 1. The copolymer was prepared via the integrated process using stoichiometric amounts of reactants.

The reaction set-up was essentially the same as in example 1, except that a 500 ml 4-neck, round bottom flask was used. The flask was charged with 25.68 g (0.112 moles) of bisphenol-A, 100 ml of chlorobenzene and 51 g of DMSO. The two-way addition funnel was filled with 75 ml of chlorobenzene. Stirring and nitrogen circulation were started and the contents were heated to 40° C. using a silicon oil bath. Aqueous sodium hydroxide (17.7475 g; 50.5 percent, w/w) was added, and the mixture was brought slowly to 145° C. The reflux mixture contained water and chlorobenzene; it was collected in the two-way addition funnel. Chlorobenzene was continuously returned to the reaction flask, whereas the water was removed. When most of the water had distilled off, the temperature was raised to 160° C. by removing all of the chlorobenzene. At about 155° C. the bisphenol-A salt dissolved. A solution of 32.31 g (0.112 moles) of 4,4'-dichlorodiphenyl sulfone in about 30 ml of chlorobenzene was added to the reaction mixture; the latter was now held at 160° C. for 1 hour during which time it became quite viscous. A hot solution of 50 gms of polycarbonate in a mixture of 80 ml of DMSO and 90 ml of chlorobenzene was added and the reactants were held at 155° C. for an additional 0.5 hours. Note: the polycarbonate added was Lexan 101 produced by the General Electric Co., having a reduced viscosity of 0.62 dl/g.

The viscous polymerization suspension was diluted with chlorobenzene, cooled to room temperature and acidified with 5 ml of glacial acetic acid. It was then filtered to remove the salts and the clear filtrate was coagulated in 5 times its volume of isopropanol. The polymer was dried at 110°° C. (50 mm) till constant weight.

Its reduced viscosity was 0.47 dl/g and its glass transition temperature was 172° C.

What is claimed is:

1. A process for the preparation of block copolymers selected from the group consisting of (a) $(AB)_m$; (b) ABA; (c) BAB; (d) and combinations thereof, wherein A is a poly(aryl ether) block, and B is a poly(arylatecarbonate) block; the molecular eweights of the blocks A and B individually being at least 500; m is an integer and is one or greater; which process comprises the steps of
   (a) the reaction of a hydroxy-terminated poly(aryl ether) with a high molecular weight poly(arylate-carbonate) to yield a block copolymer; followed by
   (b) the coupling of the material obtained in step (a) under poly(aryl ether) forming conditions via the hydroxy/activated halobenzenoid compound, or the hydroxy/activated nitrobenzenoid compound nucleophilic polycondensation process;

wherein said poly(arylate-carbonate) comprises at least two of the following four recurring units in its linear chain

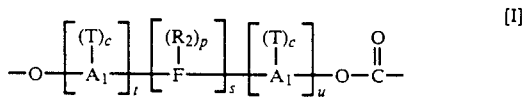

[I]

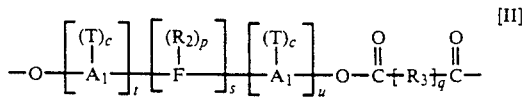

[II]

-continued

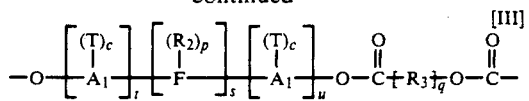

[III]

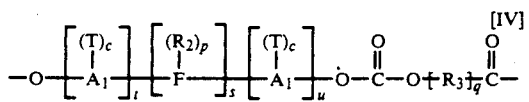

[IV]

wherein $A_1$ and $R_3$ are divalent aromatic radicals which may be the same or different; F is selected from the group of alkylene, cycloalkylene, alkylidene and cycloalkylidene; $R_2$ is hydrogen, alkyl, cycloalkyl or aryl; T is halogen, nitro, $R_2$ or $OR_2$; c is any whole number from and including zero through the number of positions available on A for substitution; p is any whole number from and including zero through the number of positions available on F for substitution; q is a whole number equal to at least one; s is zero or one; t is a whole number equal to at least one; and u is any whole number including zero.

2. A process as defined in claim 1 wherein the poly(arylate-carbonate) is the reaction product of phosgene, terephthaloyl chloride, isophthaloyl chloride, and 2,2-bis(4-hydroxyphenyl)propane.

* * * * *